United States Patent [19]
Maxwell

[11] 3,863,905
[45] Feb. 4, 1975

[54] APPARATUS AND METHOD FOR PROCESSING PLASTIC MATERIAL

[76] Inventor: Bryce Maxwell, 19 McCosh Cir., Princeton, N.J. 08540

[22] Filed: May 9, 1973

[21] Appl. No.: 358,656

Related U.S. Application Data

[63] Continuation-in-part of Ser. No. 242,700, April 10, 1972, Pat. No. 3,790,328.

[52] U.S. Cl. .................................. 259/191, 259/5
[51] Int. Cl. ............................................. B29b 1/06
[58] Field of Search ........... 259/191, 192, 193, 5, 6, 259/97; 425/207, 208, 209; 100/145

[56] References Cited
UNITED STATES PATENTS

| | | | |
|---|---|---|---|
| 3,317,962 | 5/1967 | Morse | 259/191 |
| 3,371,386 | 3/1968 | Ludwig | 259/191 |
| 3,774,890 | 11/1973 | Lemelson | 259/5 |
| 3,797,808 | 3/1974 | Peter | 259/191 |

*Primary Examiner*—Robert W. Jenkins
*Attorney, Agent, or Firm*—Sperry and Zoda

[57] ABSTRACT

An apparatus and method are provided for feeding and/or processing plastic materials or polymers in the fabrication thereof in which a stationary casing is provided with a generally tubular bore having an inlet opening at one end thereof and a discharge opening at the other end thereof. A generally cylindrical rotor is mounted in the bore of the casing and cooperates therewith to define an inlet zone adjacent the inlet opening and a working zone between the inlet zone and the discharge opening of the apparatus. A stationary material advancing member is located adjacent the inlet opening of the bore and is provided with a generally helical surface facing toward the discharge opening of the bore to cooperate with the rotor as it rotates to move material from the inlet zone toward the working zone. The helical surface of the material advancing member extends throughout at least 360° of the circumference of the rotor and serves to isolate the inlet zone from the discharge opening and in addition serves to aid in moving the material being processed into fabricating or forming equipment communicating with the discharge opening.

15 Claims, 11 Drawing Figures

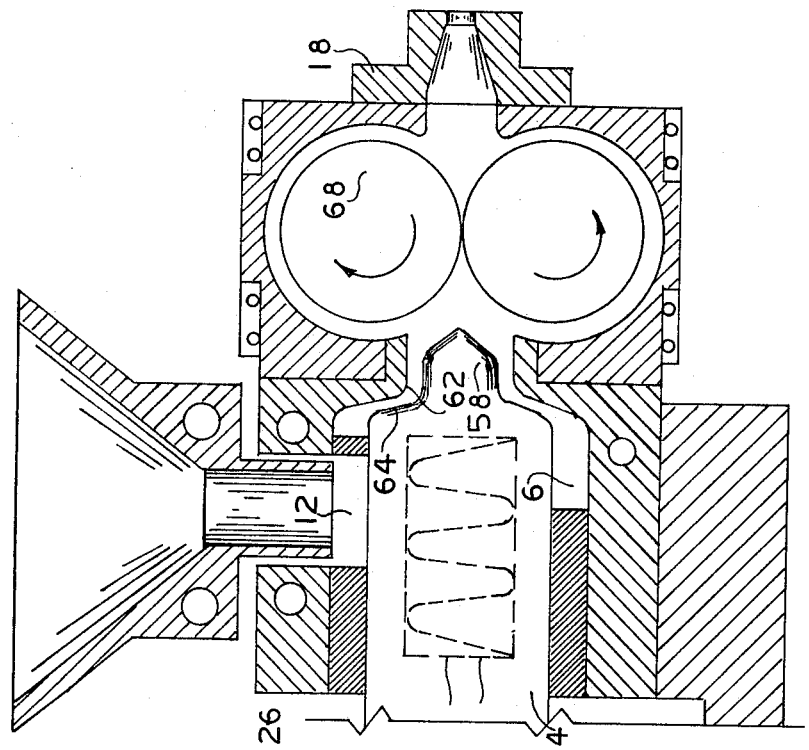
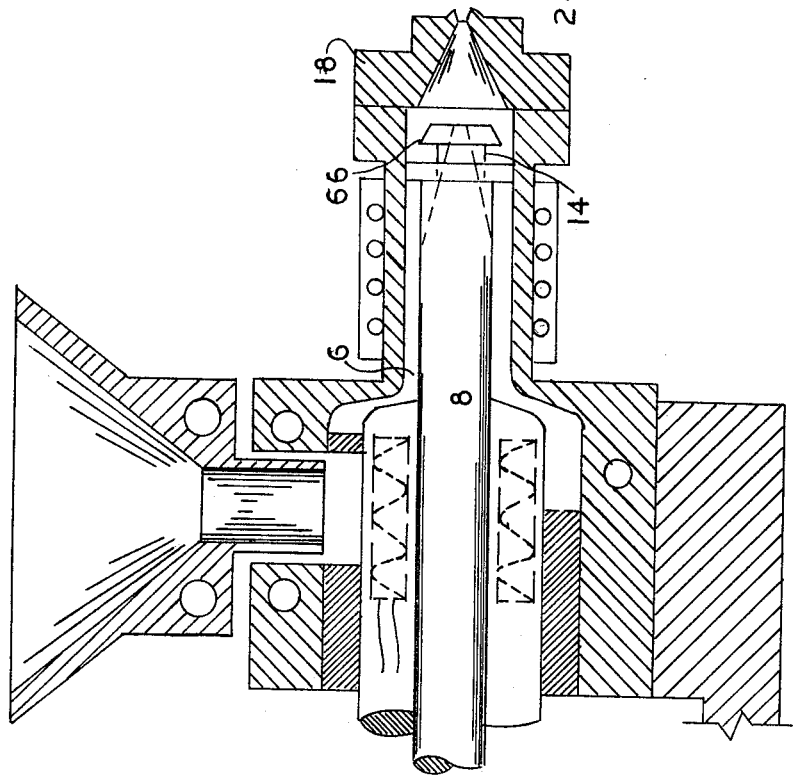

APPARATUS AND METHOD FOR PROCESSING PLASTIC MATERIAL

This application is a continuation-in-part of copending application Ser. No. 242,700 filed Apr. 10, 1972 as U.S. Pat. No. 3,790,328.

BACKGROUND OF INVENTION

The present invention relates to methods of feeding polymer material to processing and fabriction equipment and, more specifically, relates to an improved method for melting, mixing and introducing material into extruders, injection molding machines, polymer gear pumps and other similar equipment in a manner which obviates some of the undesirable features attending existing such apparatus.

In the processing of polymer material as currently practiced today the cold material is introduced into the mixing, processing or fabricating apparatus wherein it is melted and transported through or into various die means to form the material into desired shapes. Due to differences in the physical shape, heat capacities, density changes and other factors inherent in the various feed materials, the design of the melting zone of current apparatus must be varied for the various materials.

It is an objective of the present invention to provide a simple, easy to construct, apparatus for the melting and mixing of feed material which is useful in providing proper melt feed material to the final processing equipment whose design is not dependent on the nature of the original cold feed material.

For example, in the processs of screw extrusion cold feed material is conveyed from a hopper feed zone into a melting zone where the heated surfaces of the containing barrel warm the material and as it is conveyed further by the screw the material is melted and compacted until finally it is pumped by the screw action through an exit die that forms it into the desired shape. It is well recognized in the field (see for example Z. Tadmore and I. Kline, Engineering Principles of Plasticating Extrusion, Van Nostrand Remhold Book Co., N.Y., 1970) that the proper design of the feed and melting zone requires specific designs for different materials depending on the density, physical form and heat capacity as well as other factors of the original cold feed material.

It is a purpose of the present invention to provide an improved feed system that supplies polymeric or other material in a melted or mixed state to the pumping or metering or conveying screw section in which the design of said new feed system is independent of the nature of the cold feed material and which is universally applicable to the spectrum of commercially used polymeric materials.

In addition, the present invention may be used to mix, melt and convey polymer material into the injection reservoir of injection molding machines.

In addition, the present invention may be used to mix, melt and convey polymer material into the inlet port of polymer gear pumps and to supply mixed and melted polymer feed material to other types of processing and fabrication equipment.

OBJECTS AND SUMMARY OF THE INVENTION

It is therefore an object of the present invention to provide an improved method and apparatus for feeding polymer processing and fabricating equipment that is uncomplicated, lends itself to ease of manufacture and can be used with a wide variety of polymeric or other materials.

It is another object of the present invention to provide an improved method and apparatus for feeding polymer processing and fabrication equipment that is not difficult to maintain nor operate.

It is still another object of the present invention to provide an improved method and apparatus for feeding polymer processing and fabrication equipment wherein the amount of shearing and mixing may be easily and simply controlled.

It is a major object of the present invention to provide a method and apparatus for feeding polymer processing and fabricating equipment which method and apparatus solve at least some of the problems currently confronting the industry.

At least some of the above cited objects may be achieved by the provision of feed mechanism comprising a stationary tubular member and a cylindrical rotating member which is operationally disposed with respect to the stationary member to define an inlet zone communicating with an annular shear zone between the outer surface of the cylindrical rotating member and the inner surface of the stationary cylindrical member. A guide means is provided adjacent the inlet zone for urging the feed material axially along the surface of the rotating cylindrical member in response to the rotating thereof. In one feature of the invention, the guide means may be further operable to axially isolate the outlet of the feeding apparatus from the feed material inlet.

The method may be practiced by directing the material onto the cylindrical surface of the rotating member and urging the material axially along the annular shear zone in response to the rotation of the rotating member. Simultaneously, the outlet of the feeding apparatus may be axially isolated from the point of material introduction.

BRIEF DESCRIPTION OF THE DRAWINGS

While the invention is particularly pointed and distinctly claimed in a concluding portion of the specification, preferred embodiments are set forth in the following detailed description which may be best understood when read in connection with the accompanying drawings, in which:

FIG. 6 is an axial cross sectional view of still another embodiment of the present invention for improved melt plasticizing, intensive shearing and improved injection molding;

FIG. 7 is an axial cross sectional view of still another embodiment of the present invention for feeding polymer melt to a gear pump;

FIG. 8 is an axial cross sectional view of still another embodiment of the present invention for controlling the amount of intensive shear the polymer melt is subjected to;

FIG. 9 is an axial cross sectional view of still another embodiment of the present invention for still another method of controlling the amount of intensive shear the polymer melt is subjected to;

PREFERRED EMBODIMENT OF INVENTION

Figure 1:
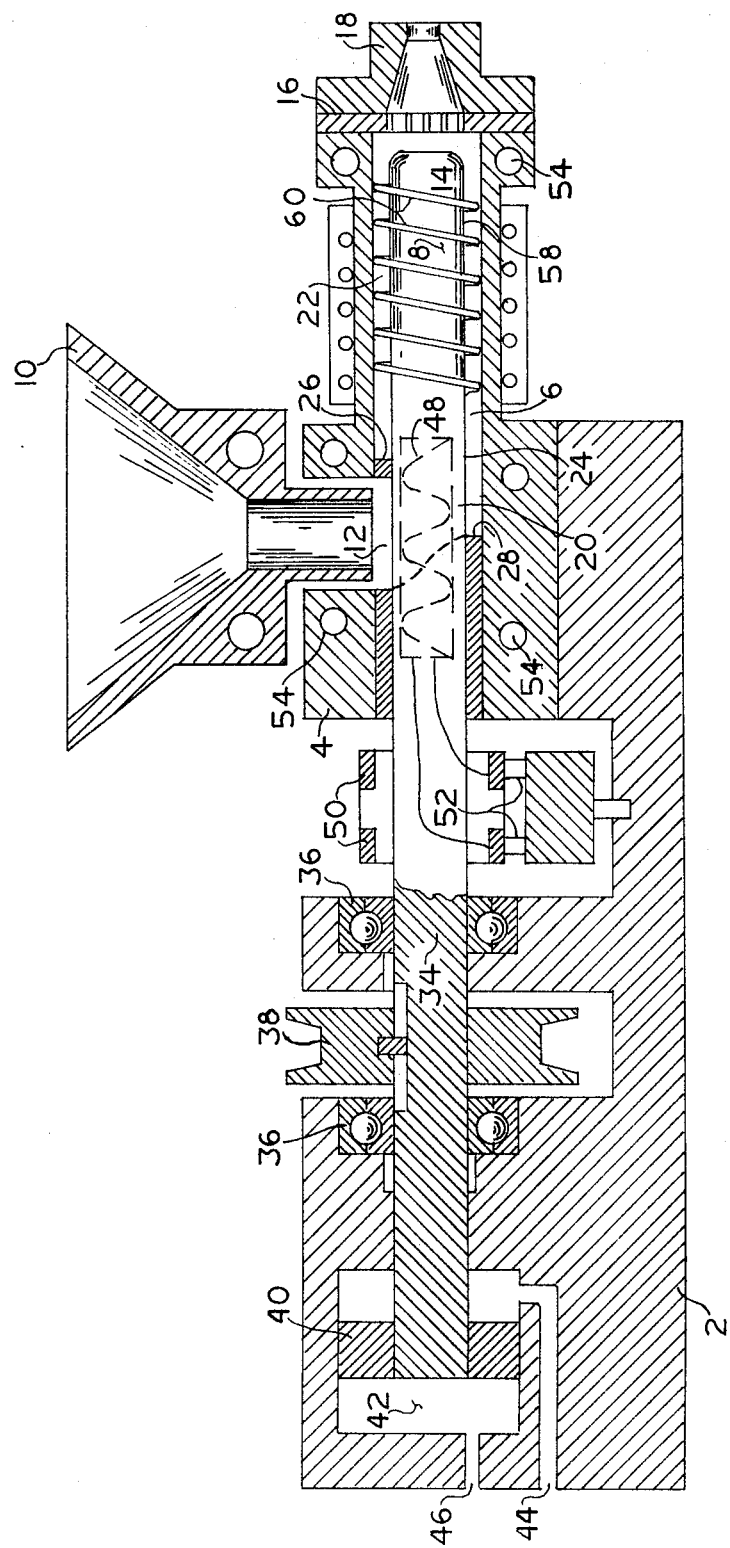
FIG. 1 is an axial cross sectional view of a preferred embodiment of the present invention for the purpose of injection molding and extrusion.
Figure 2:
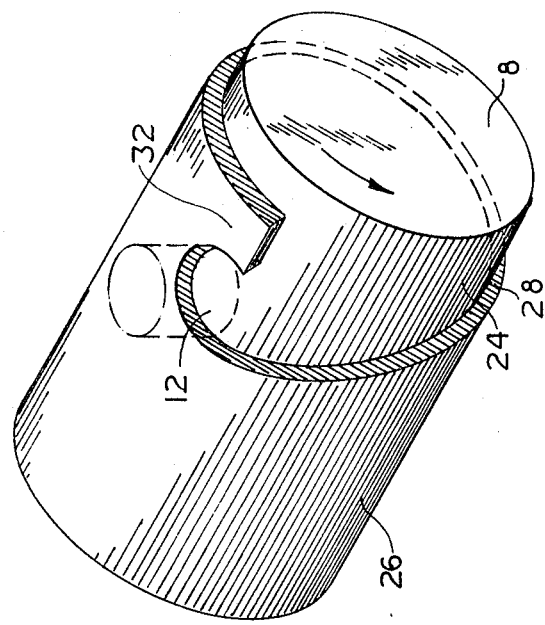
FIG. 2 is a diagrammatic view showing a typical form of guide means of the present invention for urging feed material from an inlet zone toward a working or shearing zone or a screw extruder, injection reservoir, or other processing equipment.
Figure 3:
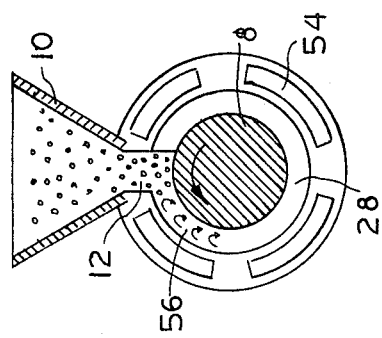
FIG. 3 is a diagrammatic sectional view perpendicular to the axis of rotation of the feed apparatus for the purpose of illustrating the principle of operation and the heating and cooling of the feed apparatus.

In that form of the invention chosen for purposes of illustration in FIGS. 1, 2, and 3 of the drawings, the apparatus embodies a base 2 having a casing 4 supported thereon and provided with a longitudinally extending bore 6 within which a generally cylindrical rotor 8 is mounted for rootation. A hopper 10 communicates with the bore 6 through an inlet opening 12 for supplying material to the bore whereas the opposite end of the bore is provided with a discharge opening 14 from which treated material may pass to forming or fabricating equipment such as a breaker plate 16 and a forming die 18.

The inner surface of the bore 16 of casing 4 and the outer surface of the rotor 8 are formed to present cooperating surfaces defining an inlet zone 20 adjacent the inlet opening 12 and a working, shearing or compacting zone 22. The zone 22 communicates at one end with the inlet zone 20 and communicates at its opposite end with the discharge opening 14 of the bore 6.

The portion 24 of the rotor 8 adjacent the inlet opening 12 is cylindrical in form and beneath the hopper 10 is cylindrical in form and is surrounded by stationary material advancing means 26 which substantially closes the radial space between the rotor and casing.

Further, as shown in FIG. 2, the material advancing means 26 is formed with a circumferentially extending helical surface 28 which is positioned normal to the outer surface of the portion 24 of the rotor and faces toward the discharge opening 14 of the bore 6. The surface 28 extends from a point upstream of the inlet opening 12 throughout at least 360° of the circumference of the rotor to a point adjacent the working zone 22 and is inclined axially in the direction of rotation of the rotor whereby material moving along the surface 28 will be urged longitudinally of the rotor. Moreover, the extremity or other portion 32 of the helical surface 28 is thereby located between the inlet opening 12 and the working zone 22 within the bore of the apparatus. The material advancing member thus serves to isolate the inlet opening 12 from the working zone and discharge outlet so that back pressure and regurgitation of the material being fed into the bore 6 is reduced or eliminated altogether.

The rotor 8 is secured to a shaft 34 mounted in bearings 36 and may be driven by any suitable means such as the pulley 38. The rotor 8 and shaft 34 also may be moved axially with respect to the bore 6 and material advancing means 26 by means of a piston 40 in cylinder 42 to which fluid may be supplied through ports 44 and from which it may be vented through a port 46.

The rotor 8 is heated by heating element 48 supplied with current through slip rings 50 and brushes 52 or by any other suitable means and the temperature of the casing 6, hopper 10, and other elements of the assembly may be heated or cooled as desired by the circulation of heating or cooling agents through passages 54 therein or by any other suitable means.

In operating the apparatus shown the material to be treated is supplied to the hopper 10 from which it passes through the inlet opening 12 onto the heated and rotating portion 24 of the rotor 8 adjacent the inlet opening and the inlet zone 20 of the bore 6. The material then moves circumferentially with the rotor 8 and is advanced axially of the rotor and longitudinally of the bore 6 by engagement with the helical surface 28 of the material advancing means. As a result, the material is heated and positively moved from the inlet zone to the working zone and toward the discharge outlet of the apparatus. As the same time, the material is softened or melted and is worked and folded or blended in the manner indicated by the arrow 56 in FIG. 3.

The portion 58 of the rotor 8 within the working zone 22 of the bore 6 has screw flights 60 thereon which serve to further advance, compact, and work the material by continued operation of the rotor. During such working the rotor itself may be moved axially and rearwardly or to the left as seen in FIG. 1, by introducing fluid through port 44 into the cylinder 42 so as to move the piston 40 and rotor 8 to the left allowing the material to build up within the bore 6 adjacent the discharge opening 14 as a reservoir. The material then may be discharged by closing port 44 and opening port 46 so that the piston 40 and rotor 8 will be moved to the right as seen in FIG. 1. The material is thus forced from the reservoir established in the bore 6 through the openings in breaker plate 16 to a forming die 18 or other fabricating equipment with which the apparatus is associated.

The construction and operation thus provided renders it possible to use a single design and simplified elements in handling cold feed material to effect the movement and transportation thereof to the screw section or working zone regardless of the nature or physical properties of the material. It is therefore possible to eliminate the cold screw feed and metering mechanisms heretofore required and special design of the apparatus to comply with the individual nature and physical form of the material being handled is not necessary.

Figure 4:
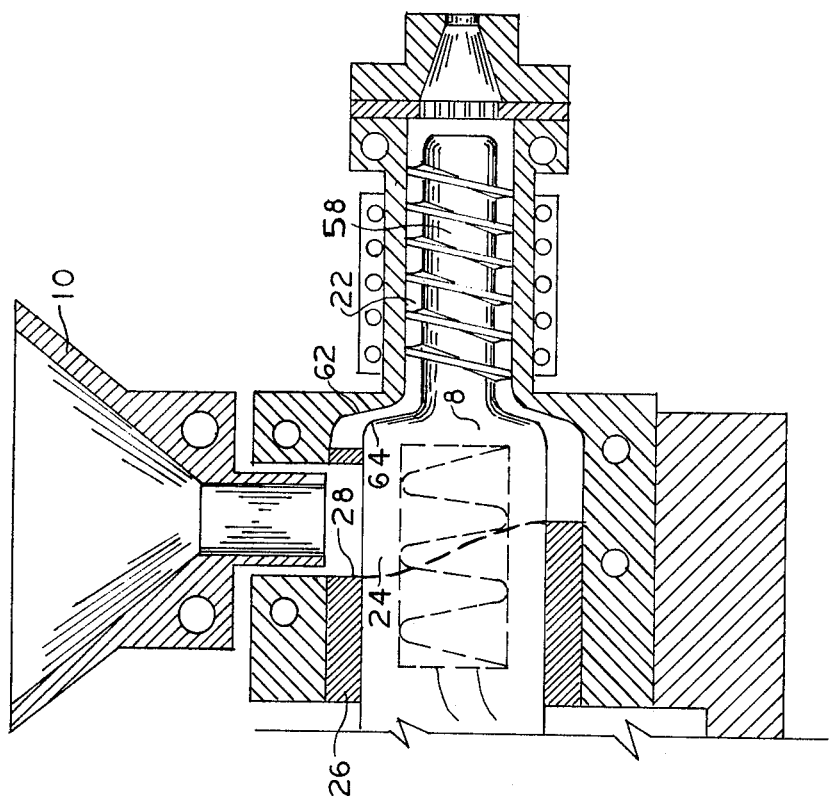
FIG. 4 is another axial cross sectional view of another embodiment of the present invention with improved high intensity shearing.

Apparatus embodying the present invention is capable of many variations and adaptations. Accordingly, as shown in FIG. 4, the diameter of the portion 24 of the rotor 8 which is adjacent to the inlet opening 12, may be substantially greater than the portion 58 thereof within the working zone 22. Furthermore, cooperating surfaces 62 and 64 on the casing and rotor may be inclined toward each other to form a restricted passage which will afford an intense shearing action to further work, blend or plasticize the material being handled.

Figure 5:
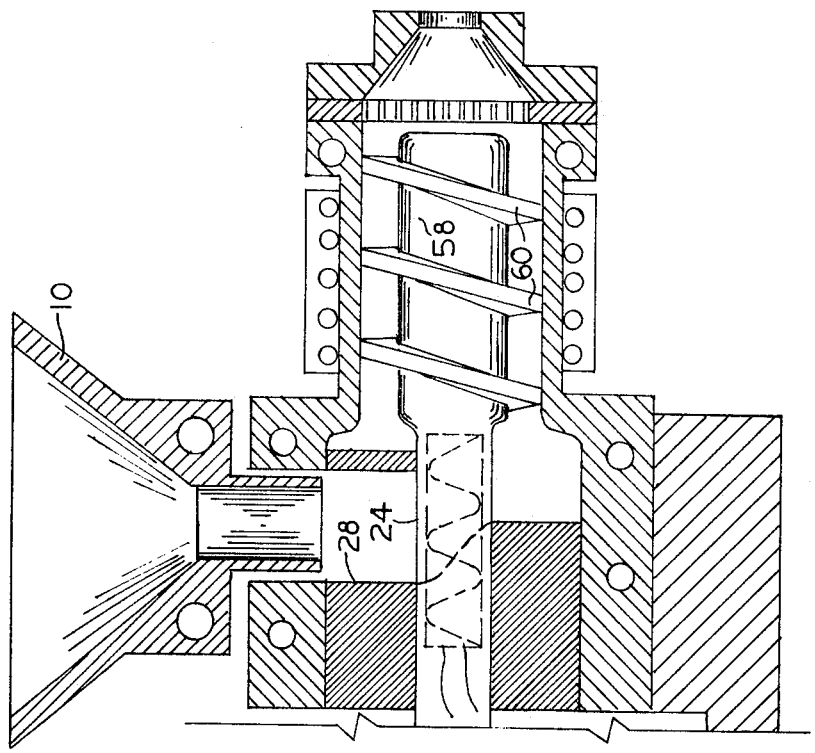
FIG. 5 is still another axial cross sectional view of another embodiment of the present invention with improved melt plasticizing capacity.

In the alternative, as shown in FIG. 5, the portion 24 of the rotor in the inlet zone of the apparatus may be of smaller diameter than the portion 58 which carries the screw flight 60 of the rotor.

As shown in FIG. 6, the rotor 8 does not necessarily embody any screw flights and the discharge opening 14 of the bore 6 may be provided with a valve mechanism 66 permitting ready flow of material through the discharge opening while preventing reverse flow therethrough. When the reservoir within the bore 6 and about the rotor 8 has been filled the rotor may be moved axially of the bore toward the discharge opening to force material therethrough into the forming die 18 or other fabricating equipment.

The construction shown in FIG. 7 utilizes a rotor having a heated portion 24 of relatively large diameter and presents a shearing surface 64 cooperating with the shearing surface 62 on the inner surface of the bore 6 of the casing. The material advancing means 26 serves to move the material from the inlet opening 12 past the shearing surfaces and the portion 58 of the rotor to a gear pump 68 and forming die 18 or the like.

Figure 8:
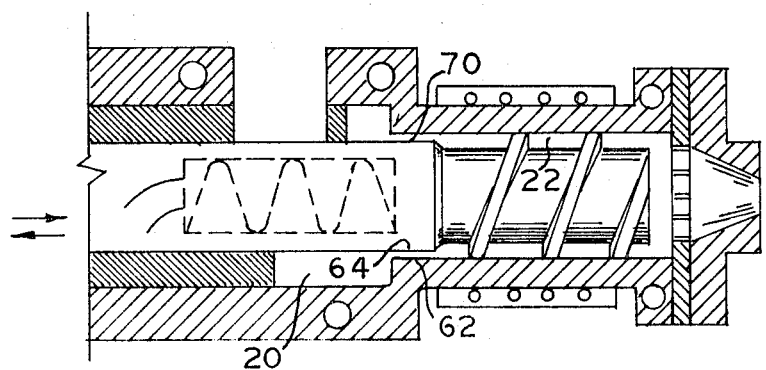

In the construction of FIG. 8 the surfaces of the rotor and bore of the apparatus cooperate to present a restricted flow channel 70 therebetween so that the material will flow in a controlled manner from the inlet zone 20 toward a reservoir or working zone 22 while undergoing intense shearing action between the surfaces 62 and 64 of the casing and rotor. Moreover, the amount of resistance to axial flow of the material and the extent of duration of such shearing action can be controlled or varied by axial movement of the rotor as described in connection with FIG. 1.

Figure 9:
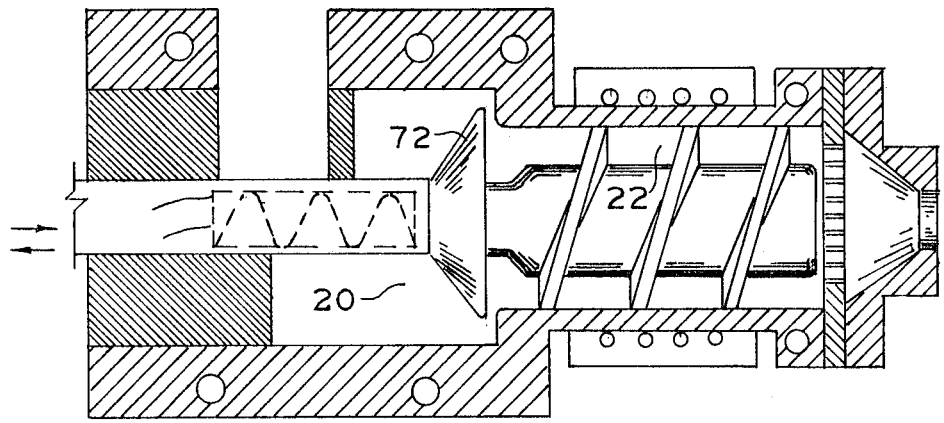

Another method of controlling the passage of the material through the apparatus is illustrated in FIG. 9, wherein the rotor is provided with a barrier member 72 by which the flow of material from the inlet zone 20 to working zone 22 may be controlled by axial movement of the rotor. In the same way the degree or intensity of the shearing action which takes place between the cooperating surfaces of the barrier member and casing can be varied as desired in handling any particular material.

Figure 10:
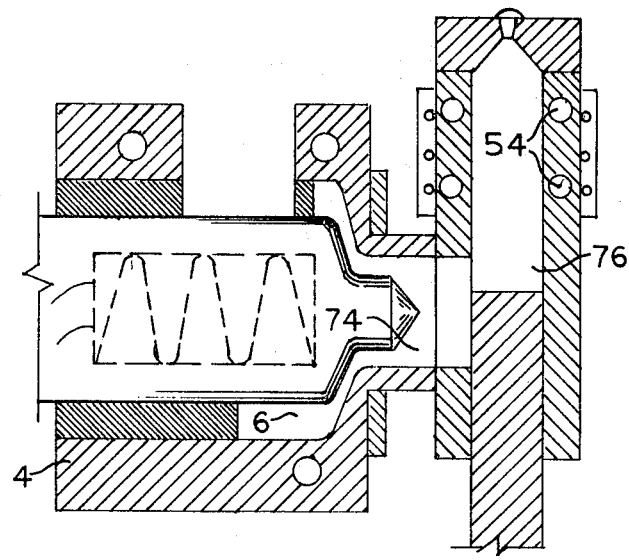
FIG. 10 is a sectional view of still another embodiment of the present invention for feeding separately driven extrusion screws or injection molding machines.

The apparatus of FIG. 10 is generally similar to that of FIG. 7 but is designed to prepare and feed material in a controlled manner from a reservoir area 74 within the bore 6 of the casing 4 to the chamber 76 of equipment such as an independently powered injection plunger, screw extruder, or metering device for use in fabricating the composition treated by the apparatus. For this purpose the chamber 76 may be provided with heating means or otherwise constructed to utilize the material directly as formed and discharged from the discharge opening 14 of the casing.

Figure 11:
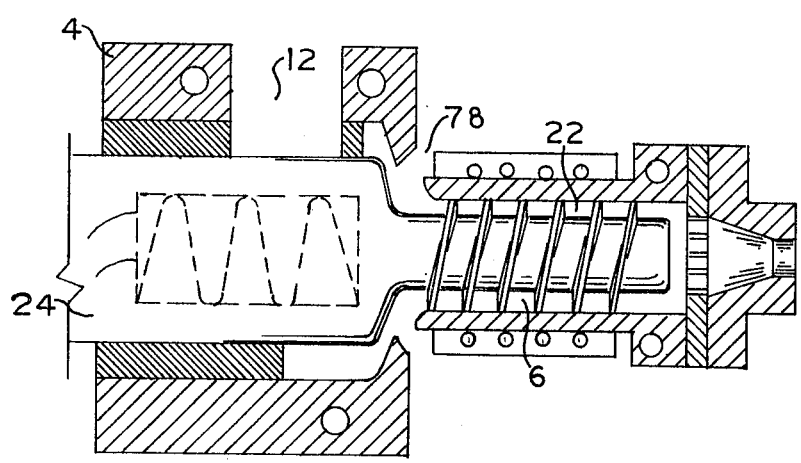
FIG. 11 is a sectional view of still another embodiment of the present invention for the purpose of devolatizing or adding to the polymer melt before feeding to a screw extruder.

As illustrated in FIG. 11, the apparatus embodying the present invention may employ a casing 4 having a vent opening 78 communicating with the working zone 22 or elsewhere within the bore 6 of the casing to permit air, gases or volatile agents to be expelled from the material during the compacting or working thereof. In the alternative, additives such as plasticizers or reactants may be introduced through opening 78 into contact with the material being treated to alter or improve the properties of the material prior to discharge thereof from the apparatus.

In each of the embodiments of the invention shown and described above, the material may be introduced into the apparatus in a cold condition and in an available form and physical state as described and will be advanced into and through the bore of the casing without special design or configuration of the apparatus. Moreover, the material advancing means isolates the working and pressure areas and the discharge outlet of the bore from the inlet opening so as to assure proper and continued feeding and treatment of the material in a plastic, molten or fluid condition without regurgatation or discontinuity in the operation.

It will therefore be apparent that the apparatus is capabe of extended and various uses and is highly versatile in its application. In view thereof, it should be understood that the particular embodiments of the invention shown in the drawings and described above are intended to be illustrative only and are not intended to limit the scope of the invention.

What is claimed is:

1. Apparatus for use in processing plastic material comprising a casing having a tubular bore therein, having an inlet opening near one end thereof and a discharge opening near the opposite end thereof, (an essentially cylindrical rotor located in said bore) a rotor in said bore having a cylindrical form in that portion thereof located adjacent said inlet opening, means for rotating said rotor in a predetermined direction, said casing and rotor having cooperating surfaces defining an inlet zone located near said inlet opening, and means for advancing material from said inlet zone towards said discharge outlet including a stationary member surrounding that portion of the rotor adjacent said inlet zone and presenting a helical surface facing toward said discharge opening and inclined in said predetermined direction throughout at least 360° circumferentially of said rotor.

2. Aapparatus as defined in claim 1 wherein said means for advancing material includes a portion located between said inlet opening and said discharge opening to isolate said inlet opening from said discharge opening.

3. Apparatus as defined in claim 1 wherein that portion of the rotor adjacent said inlet opening is provided with heating means.

4. Apparatus as defined in claim 1 wherein said rotor and casing are provided with means for controlling the temperature thereof.

5. Apparatus as defined in claim 1 wherein that portion of the rotor adjacent said inlet opening is of larger diameter than that portion of the rotor near said discharge opening.

6. Apparatus as defined in claim 1 wherein that portion of the rotor between said inlet zone and said discharge opening is provided with helical means on the exterior thereof inclined in said predetermined direction.

7. Apparatus as defined in claim 1 wherein the cooperating surfaces of the casing and rotor are formed to define a passage of decreasing cross section for imparting a shearing action to material moving from said inlet opening toward said discharge opening upon rotation of said rotor.

8. Apparatus as defined in claim 1 wherein said rotor is movable axially within the bore of said casing.

9. Apparatus as defined in claim 1 wherein means are provided for moving said rotor toward and away from said discharge opening.

10. Apparatus as defined in claim 1 wherein said rotor is movable axially within the bore of the casing to provide a reservoir for worked material between the end of said rotor and said discharge opening, and means are provided for moving said rotor toward said discharge opening to force worked material through said reservoir thrugh said discharge opening.

11. Apparatus as defined in claim 1 wherein material forming equipment communicate with the discharge opening of the bore in said casing.

12. Apparatus as defined in claim 11 wherein said equipment is a gear pump.

13. Apparatus as defined in claim 11 wherein said equipment includes a forming die.

14. Apparatus as defined in claim 11 wherein said equipment is an independently powered injection molding device.

15. The method of working plastic material in a device having a bore with an inlet opening at one end and an outlet opening at the other end thereof together with a rotor rotatably mounted in said bore, which comprises positioning about said rotor a member having a helical surface inclined in a predetermined direction and extending from a point adjacent said inlet opening throughout at least 360° circumferentially of the rotor, introducing material to be worked into said bore through said inlet opening and into contact with said rotor, rotating said rotor in said predetermined direction and heating said rotor to positively move material axially of the rotor and away from said inlet opening and toward said discharge opening.

* * * * *